United States Patent
Wu et al.

(10) Patent No.: US 6,982,870 B2
(45) Date of Patent: Jan. 3, 2006

(54) PORTABLE STORAGE DEVICE CAPABLE OF BEING DISASSEMBLED EASILY

(75) Inventors: Chia-Shiun Wu, Taipei Hsien (TW); Ching-Chuan Huang, Taipei Hsien (TW)

(73) Assignee: Wistron Corporation, Hsi-Chih (TW)

( * ) Notice: Subject to any disclaimer, the term of this patent is extended or adjusted under 35 U.S.C. 154(b) by 132 days.

(21) Appl. No.: 10/708,539

(22) Filed: Mar. 10, 2004

(65) Prior Publication Data

US 2005/0128696 A1  Jun. 16, 2005

(30) Foreign Application Priority Data

Dec. 11, 2003  (TW) .............................. 92135014 A

(51) Int. Cl.
*H05K 5/00* (2006.01)
*H05K 7/00* (2006.01)

(52) U.S. Cl. .................... 361/685; 361/683; 312/332.1
(58) Field of Classification Search ................ 361/683, 361/684, 685; 312/332.1, 332.2, 332.3, 333; 248/618, 633, 634, 636; 369/75.2, 76, 77.2, 369/78, 79; 174/136
See application file for complete search history.

(56) References Cited

U.S. PATENT DOCUMENTS

| | | | | |
|---|---|---|---|---|
| 5,406,450 A | * | 4/1995 | Shieh .......................... | 361/686 |
| 5,519,571 A | * | 5/1996 | Shieh .......................... | 361/685 |
| 6,366,457 B1 | * | 4/2002 | Otto et al. ................... | 361/685 |
| 6,614,654 B2 | * | 9/2003 | Chen et al. .................. | 361/685 |
| 6,782,841 B2 | * | 8/2004 | Esposito ...................... | 114/366 |
| 6,791,829 B1 | * | 9/2004 | Chen et al. .................. | 361/685 |
| 6,826,044 B2 | * | 11/2004 | Gan et al. .................... | 361/685 |
| 6,826,045 B2 | * | 11/2004 | Chen ........................... | 361/685 |
| 6,840,801 B1 | * | 1/2005 | Behl ........................ | 439/541.5 |
| 6,853,549 B2 | * | 2/2005 | Xu ............................... | 361/685 |
| 6,862,174 B2 | * | 3/2005 | Chien et al. ................. | 361/685 |
| 6,862,178 B2 | * | 3/2005 | Liao ............................ | 361/685 |
| 6,891,723 B1 | * | 5/2005 | Lin et al. ..................... | 361/685 |
| 6,925,246 B1 | * | 8/2005 | Behl ............................ | 386/46 |
| 2004/0075978 A1 | * | 4/2004 | Chen et al. .................. | 361/685 |
| 2004/0095717 A1 | * | 5/2004 | Hsu et al. .................... | 361/685 |
| 2004/0100762 A1 | * | 5/2004 | Yuan et al. .................. | 361/685 |
| 2004/0190266 A1 | * | 9/2004 | Chung ......................... | 361/724 |
| 2005/0052841 A1 | * | 3/2005 | Chen et al. .................. | 361/685 |

* cited by examiner

*Primary Examiner*—Lynn Feild
*Assistant Examiner*—Ingrid Wright
(74) *Attorney, Agent, or Firm*—Winston Hsu

(57) ABSTRACT

A portable storage device assembled inside a housing of a computer. The computer includes a storage device fixture including at least one fixing hole. The portable storage device includes a storage module, a bracket for carrying the storage module, and an elastic structure connected to the bracket including at least one stop component on the elastic structure for wedging in the fixing hole on the storage device fixture so as to fix the connection between the portable storage device and the computer. When the elastic structure is pressed down, the stop component of the elastic structure does not wedge in the fixing hole on the storage device fixture, and when the elastic structure is not pressed down and is restored to the original location, the stop component of the elastic structure wedges in the fixing hole on the storage device fixture.

20 Claims, 7 Drawing Sheets

PORTABLE STORAGE DEVICE CAPABLE OF BEING DISASSEMBLED EASILY

BACKGROUND OF INVENTION

1. Field of the Invention

The present invention relates to a portable storage device, and more specifically, to a portable storage device capable of being disassembled from a computer easily.

2. Description of the Prior Art

People have to take apart computers when replacing broken components or upgrading instruments inside the computer. So computers capable of being disassembled easily are necessary. It is also inconvenient for users to disassemble a storage device such as a hard disk from a computer.

Please refer to FIG. 1. FIG. 1 is a diagram illustrating assembling a hard disk 15 into a computer 10 in the prior art. The computer 10 includes a housing 11 similar to rectangular shape, a power supply 12 installed on the right rear side inside the housing 11, an optical disk drive fixture 13 installed on the right front side inside the housing 11, and a hard disk fixture 14 installed under the optical disk drive fixture 13 inside the housing 11. The hard disk fixture 14 includes a plurality of fixing holes 17 on both the left and right sides. The hard disk 15 can be placed inside the housing 11 from the front, rear, or top sides of the housing 11. The hard disk 15 includes a plurality of tapped holes 16 on both the left and right sides. The hard disk 15 can be fixed on the hard disk fixture 14 by screwing the tapped holes 16 and the fixing holes 17.

Before users assemble the hard disk 15 from the computer 10, they have to disassemble an optical disk drive first and then loosen screws on both the left and right sides of the hard disk fixture 14. Because the inner space of the computer 10 is limited, it is difficult to disassemble the hard disk 15. Some hard disks are placed inside the housing 11 from the rear side of the housing 11, so that the power supply 12 has to be disassembled before disassembling the hard disk 15. Disassembling the power supply 12 is even more difficult than disassembling the optical disk drive. No matter where the hard disk 15 is placed inside the housing 11, it is difficult to screw the hard disk 15 in using the limited space inside the housing 11.

SUMMARY OF INVENTION

It is therefore a primary objective of the present invention to provide a portable storage device capable of being disassembled from a computer easily to solve the problems mentioned above.

Briefly summarized, a portable storage device assembled inside a housing of a computer is proposed. The computer includes a storage device fixture including at least one fixing hole. The portable storage device includes a storage module, a bracket for carrying the storage module, and an elastic structure connected to the bracket including at least one stop component on the elastic structure for wedging in the fixing hole on the storage device fixture so as to fix the connection between the portable storage device and the computer. When the elastic structure is pressed down, the stop component of the elastic structure does not wedge in the fixing hole on the storage device fixture so that the portable storage device can be separated from the computer, and when the elastic structure is not pressed down and is restored to the original location, the stop component of the elastic structure wedges in the fixing hole on the storage device fixture so as to fix the portable storage device inside the computer.

Briefly summarized, a computer includes a housing, a storage device fixture installed inside the housing including at least one fixing hole, and a portable storage device. The portable storage device includes a storage module, a bracket for carrying the storage module, and an elastic structure connected to the bracket including at least one stop component for wedging in the fixing hole on the storage device fixture so as to fix the connection between the portable storage device and the computer. When the elastic structure is pressed down, the stop component of the elastic structure does not wedge in the fixing hole on the storage device fixture so that the portable storage device can be separated from the computer, and when the elastic structure is not pressed down and is restored to the original location, the stop component of the elastic structure wedges in the fixing hole on the storage device fixture so as to fix the portable storage device inside the computer.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
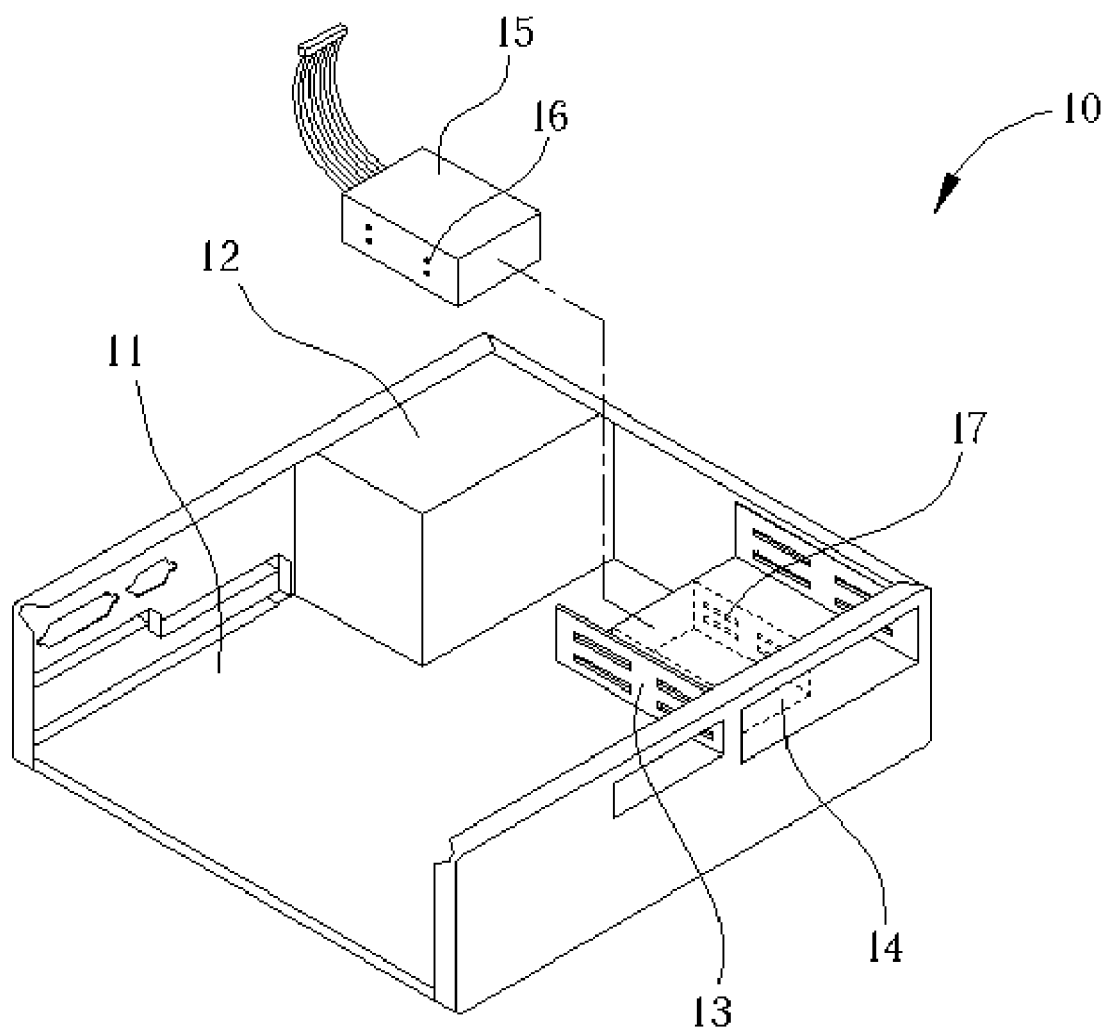
FIG. 1 is a diagram illustrating assembling a hard disk into a computer in the prior art.
Figure 2:
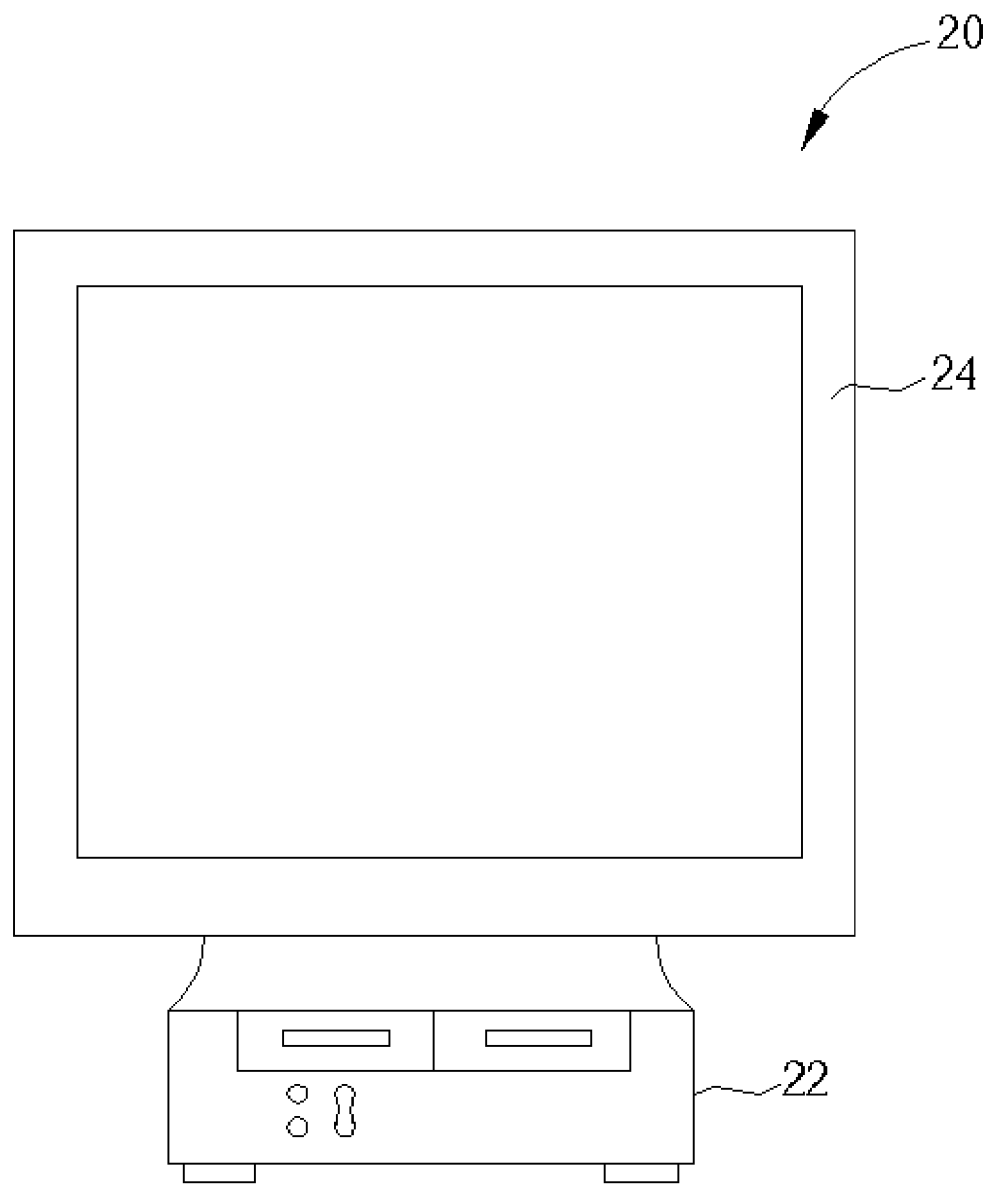
FIG. 2 is a front view of a computer according to the present invention.
Figure 3:
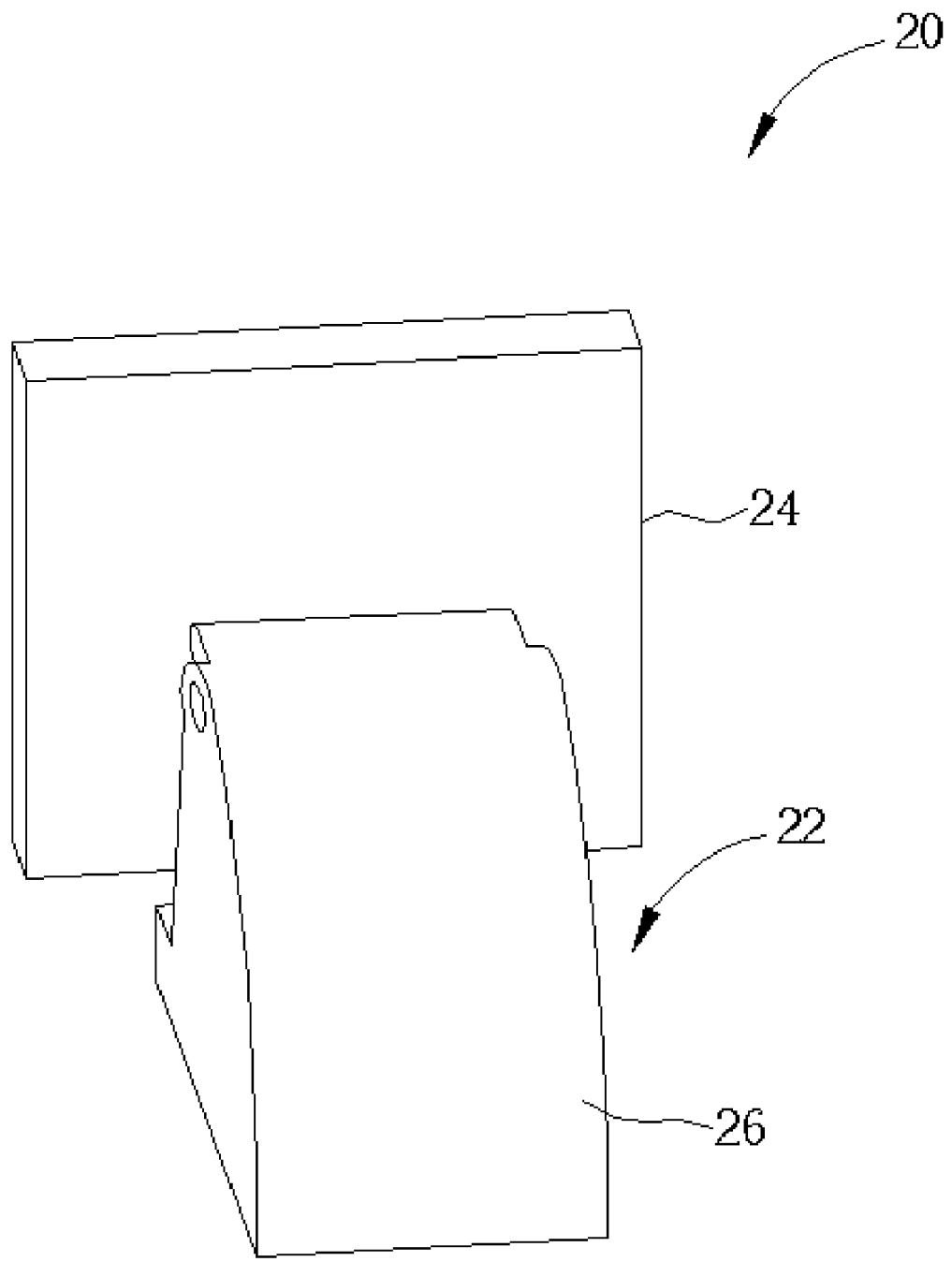
FIG. 3 is a rear view of the computer according to the present invention.
Figure 4:
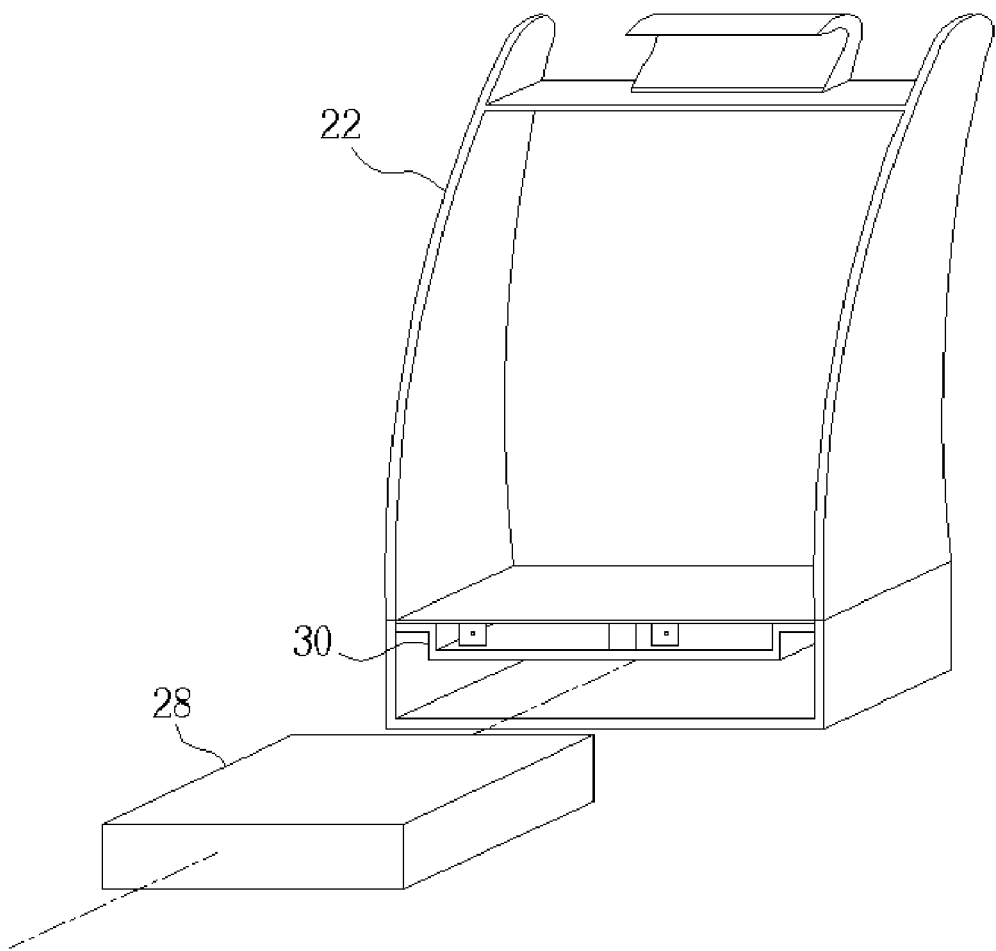
FIG. 4 is a diagram illustrating the combination of a computer host and a portable storage device.

Please refer to FIG. 2 and FIG. 3. FIG. 2 is a front view of a computer 20 according to the present invention. FIG. 3 is a rear view of the computer 20 according to the present invention. The computer 20 includes a computer host 22 and a display 24. The computer host 22 includes a housing 26 for covering components inside the computer host 22. Please refer to FIG. 4. FIG. 4 is a diagram illustrating the combination of the computer host 22 and a portable storage device 28. When the housing 26 of the computer host 22 shown in FIG. 3 is disassembled, the portable storage device 28 can be placed into the computer host 22 from the rear side of the computer 20. The computer further includes a storage device fixture 30 installed inside the housing 26 of the computer host 22, and the portable storage device 28 can be placed into the computer host 22 from the rear side of the computer 20 and combined with the storage device fixture 30.

Figure 5:
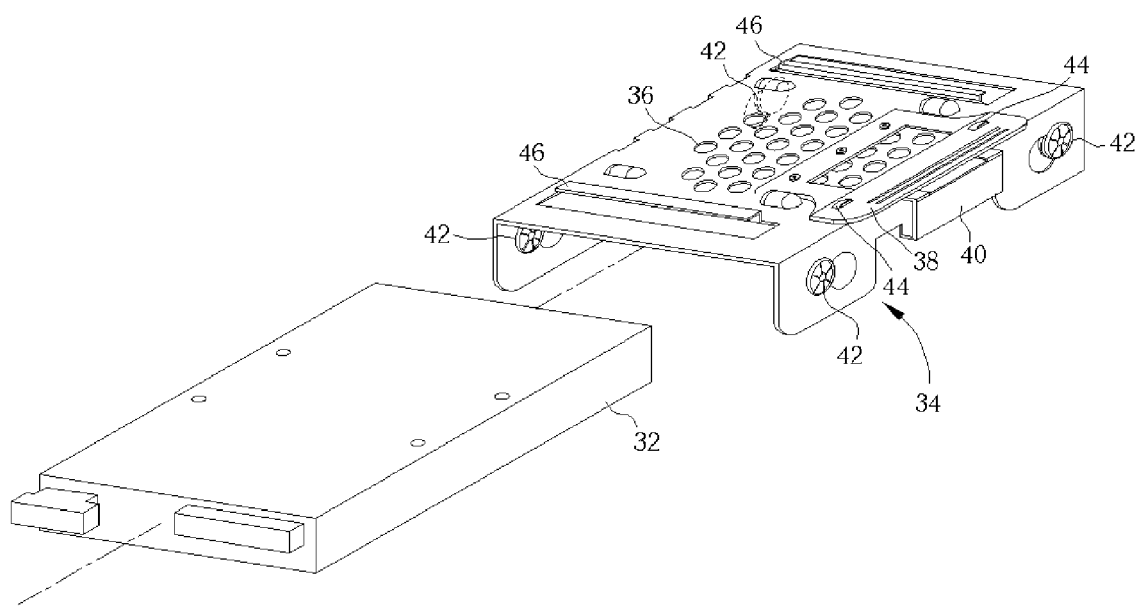
FIG. 5 is a drawing of the portable storage device.

Please refer to FIG. 5. FIG. 5 is a drawing of the portable storage device 28. The portable storage device 28 includes a storage module 32 such as a hard disk, an optical disk drive, or a floppy drive, and a bracket 34 for carrying the storage module 32. The bracket 34 includes a plurality of diffusing holes 36 for diffusing heat generated by the storage module 32. The portable storage device 28 further includes an elastic structure 38 connected to the bracket 34. The elastic structure 38 can be riveted to the bracket 34, and the elastic structure 38 can be made of stainless steel fragment. The bracket includes a handle 40 for supporting the downward force applied to the elastic structure 38 so as to avoid the structural failure of the elastic structure 38 due to the over-bending condition. The portable storage device 28 further includes four spacers 42 installed on the four corners of the bracket 34 and between the storage module 32 and the bracket 34. The spacers can prevent the storage module 32 from contacting the bracket 34 and prevent the vibration generated by the storage module 32 from being transmitted to the bracket 34 and then being transmitted to the whole body of the computer host 22. Therefore the whole noise and vibration effects can be reduced. In addition, because the spacers prevent the storage module 32 from contacting the bracket 34 directly, the heat-diffusing effect on the storage module 32 can be improved. The spacers can be made of conductive rubber material for avoiding the electromagnetic interference (EMI) effect. The elastic structure 38 includes two stop components 44. The stop components 44 can be flanges on the elastic structure 38. The bracket 34 includes two sliding plates 46.

Figure 6:
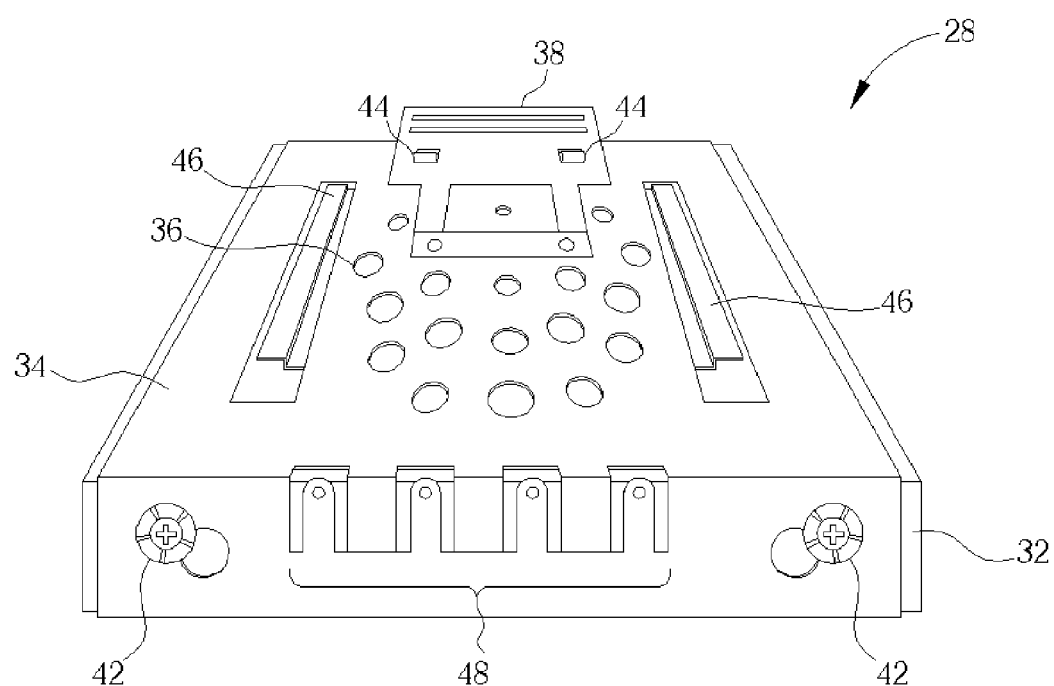
FIG. 6 is a rear view of the portable storage device.

Please refer to FIG. 6. FIG. 6 is a rear view of the portable storage device 28. The bracket 34 further includes a plurality of cushions 48 installed on one side of the bracket 34.

Figure 7:
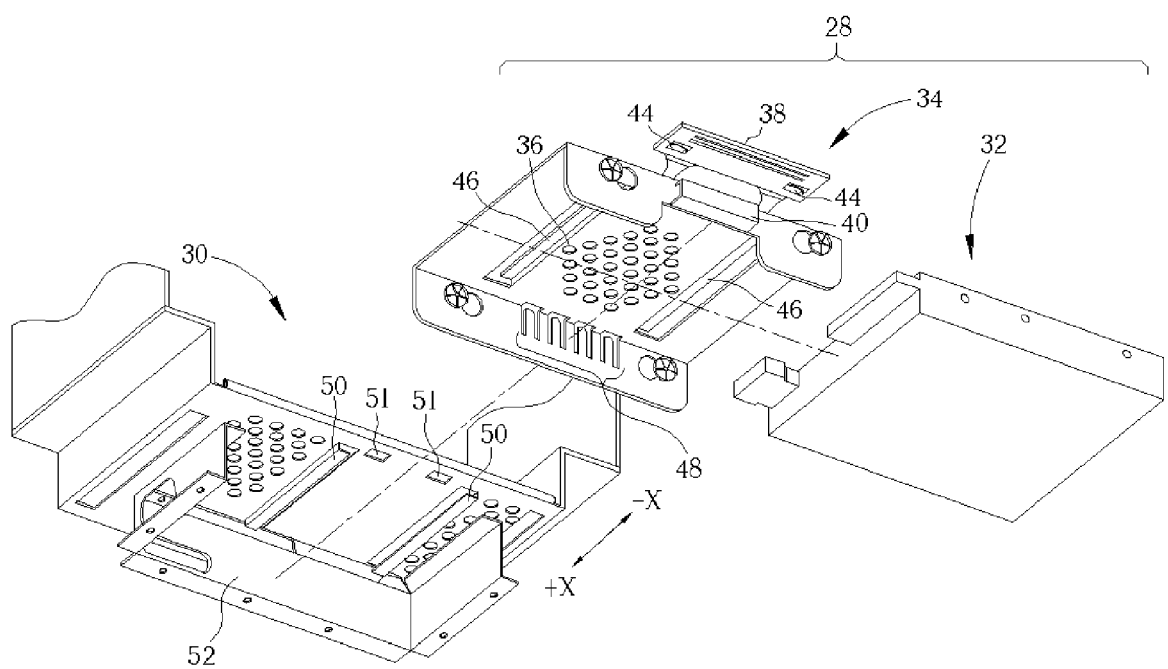
FIG. 7 is a diagram illustrating the combination of the portable storage device and the storage device fixture.

Please refer to FIG. 7. FIG. 7 is a diagram illustrating the combination of the portable storage device 28 and the storage device fixture 30. The storage device fixture 30 includes two sliding tracks 50. The two sliding plates 46 on the bracket 34 can slide on the two sliding tracks 50 on the storage device fixture 30. The storage device fixture 30 further includes two fixing holes 51. The two stop components 44 on the elastic structure 38 can wedge in the two fixing holes 51. For placing the portable storage device 28 into the computer 20, the portable storage device 28 can be pushed forward under the storage device fixture 30 along the +X axis direction. For assembly, the elastic structure 38 is first pressed down, and the handle 40 can support the downward force applied to the elastic structure 38 so as to avoid the structural failure of the elastic structure 38 due to the over-bending condition. And then at the same time the two sliding plates 46 of the bracket 34 are slid down on the two sliding tracks 50 of the storage device fixture 30 until the portable storage device 28 is pushed against a baffle 52 in the rear of the portable storage device 28. The plurality of cushions 48 in the rear of the bracket 34 will deform because the portable storage device 28 presses the baffle 52. When users release the pushing force for pushing the portable storage device 28, the cushions 48 will provide an elastic restoring force to cushion the impact of the portable storage device 28 against the baffle 52 of the storage device fixture 28 when the portable storage device 28 slides on the sliding tracks 50 so that the portable storage device 28 will return a small distance along the X axis direction. Simultaneously, because users release the elastic structure 38, the elastic structure 38 is not pressed down and is restored to the original location and the stop components 44 of the elastic structure 38 will wedge in the fixing hole 51 on the storage device fixture 30 so as to fix the portable storage device 28 inside the computer 20 smoothly.

For drawing out the portable storage device 28 from the computer 20, users have to press down the elastic structure 38 and the stop components 44 of the elastic structure 38 will not wedge in the fixing hole 51 on the storage device fixture 30 so that the portable storage device 28 can be drawn out along the −X axis direction and the portable storage device 28 can be separated from the computer 20.

The present invention is not limited to the method of pushing forward and drawing out the portable storage device 28 manually as mentioned above. For example, the motion of the portable storage device 28 can be controlled by an electrical or a mechanical mechanism. A human machine interface can be applied to the present invention so that users can input the commands of pushing or drawing out the portable storage device 28.

Compared to the prior art computer, the portable storage device according to the present invention can reduce the inconvenience of assembling the conventional storage device inside the computer and improve the assembly efficiency. Furthermore, the assembly time can be reduced and the efficiency of modular production can be increased. The present invention provides a solution for users to assemble storage devices conveniently.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A portable storage device assembled inside a housing of a computer, the computer comprising a storage device fixture comprising at least one fixing hole, the portable storage device comprising:
   a storage module;
   a bracket for carrying the storage module; and
   an elastic structure connected to the bracket comprising at least one stop component on the elastic structure for wedging in the fixing hole on the storage device fixture so as to fix the connection between the portable storage device and the computer;
   wherein when the elastic structure is pressed down, the stop component of the elastic structure does not wedge in the fixing hole on the storage device fixture so that the portable storage device can be separated from the computer, and when the elastic structure is not pressed down and is restored to the original location, the stop component of the elastic structure wedges in the fixing hole on the storage device fixture so as to fix the portable storage device inside the computer.

2. The portable storage device of claim 1 wherein the storage device fixture further comprises at least one sliding track, and the bracket comprises at least one sliding plate for sliding on the sliding track.

3. The portable storage device of claim 1 further comprising a plurality of spacers installed between the storage module and the bracket.

4. The portable storage device of claim 3 wherein the spacer is made of conductive rubber material.

5. The portable storage device of claim 1 wherein the bracket further comprises a plurality of cushions installed on one side of the bracket for providing an elastic restoring force to cushion the impact of the portable storage device against the storage device fixture so that the stop component of the elastic structure can wedge in the fixing hole on the storage device fixture smoothly.

6. The portable storage device of claim 1 wherein the bracket comprises a handle for supporting the downward force applied to the elastic structure.

7. The portable storage device of claim 1 wherein the bracket comprises a plurality of diffusing holes for diffusing heat generated by the storage module.

8. The portable storage device of claim 1 wherein the elastic structure is riveted to the bracket.

9. The portable storage device of claim 1 wherein the elastic structure is a stainless steel fragment.

10. The portable storage device of claim 1 wherein the storage module is a hard disk.

11. A computer comprising:
a housing;
a storage device fixture installed inside the housing comprising at least one fixing hole; and
a portable storage device comprising:
a storage module;
a bracket for carrying the storage module; and
an elastic structure connected to the bracket comprising at least one stop component for wedging in the fixing hole on the storage device fixture so as to fix the connection between the portable storage device and the computer;
wherein when the elastic structure is pressed down, the stop component of the elastic structure does not wedge in the fixing hole on the storage device fixture so that the portable storage device can be separated from the computer, and when the elastic structure is not pressed down and is restored to the original location, the stop component of the elastic structure wedges in the fixing hole on the storage device fixture so as to fix the portable storage device inside the computer.

12. The computer of claim 11 wherein the storage device fixture further comprises at least one sliding track, and the bracket comprises at least one sliding plate for sliding on the sliding track.

13. The computer of claim 11 wherein the portable storage device further comprises a plurality of spacers installed between the storage module and the bracket.

14. The computer of claim 13 wherein the spacer is made of conductive rubber material.

15. The computer of claim 11 wherein the bracket further comprises a plurality of cushions installed on one side of the bracket for providing an elastic restoring force to cushion the impact of the portable storage device against the storage device fixture so that the stop component of the elastic structure can wedge in the fixing hole on the storage device fixture smoothly.

16. The computer of claim 11 wherein the bracket comprises a handle for supporting the downward force applied to the elastic structure.

17. The computer of claim 11 wherein the bracket comprises a plurality of diffusing holes for diffusing heat generated by the storage module.

18. The computer of claim 11 wherein the elastic structure is riveted to the bracket.

19. The computer of claim 11 wherein the elastic structure is a stainless steel fragment.

20. The computer of claim 11 wherein the storage module is a hard disk.

* * * * *